United States Patent
Kiilunen

(10) Patent No.: US 6,780,216 B2
(45) Date of Patent: Aug. 24, 2004

(54) AIR FILTER FOR COMPUTERS

(76) Inventor: Erik Kiilunen, 25280 Renaissance Rd., Calumet, MI (US) 49913

( * ) Notice: Subject to any disclaimer, the term of this patent is extended or adjusted under 35 U.S.C. 154(b) by 40 days.

(21) Appl. No.: 10/197,394

(22) Filed: Jul. 18, 2002

(65) Prior Publication Data

US 2004/0011202 A1 Jan. 22, 2004

(51) Int. Cl.[7] .............................................. F25B 39/04
(52) U.S. Cl. ..................... 55/385.6; 55/385.1; 55/496; 55/500; 55/511; 454/184; 62/259.1; 62/507; 206/316.3; 416/247 R
(58) Field of Search ........................... 55/385.1, 385.6, 55/496, 500, 511; 454/184; 62/259.1, 507; 416/247 R

(56) References Cited

U.S. PATENT DOCUMENTS

| | | | | |
|---|---|---|---|---|
| 1,755,370 A | * | 4/1930 | Smith ........................ 55/385.3 |
| 2,705,990 A | * | 4/1955 | Miller ...................... 206/316.3 |
| 2,812,900 A | * | 11/1957 | Matthews ................ 416/247 R |
| 5,156,662 A | * | 10/1992 | Downing et al. ............. 55/493 |
| 5,687,689 A | * | 11/1997 | Santos ......................... 55/490 |
| 5,689,969 A | * | 11/1997 | Conroy ........................ 55/490 |
| 5,809,800 A | * | 9/1998 | Deal ........................... 62/507 |
| 6,221,120 B1 | * | 4/2001 | Bennington et al. ........ 55/385.1 |

* cited by examiner

Primary Examiner—Minh-Chau T. Pham
(74) Attorney, Agent, or Firm—Paul H. Gallagher

(57) ABSTRACT

A filter bag of rectangular shape is fitted over the computer to be protected. It has a main opening for receiving the computer, and is longer than the computer with the open-ended position extended beyond the computer and tied to close the main opening against the passage of air therethrough. After fitting the bag over the computer, a piece of the bag is cut to form an inner flap, and this flap with an outer flap remains hingedly secured to the bag, in register with a hole in the computer. The flap is momentarily opened for providing access to the computer and closed, and when closed provides an almost perfect seal.

13 Claims, 4 Drawing Sheets

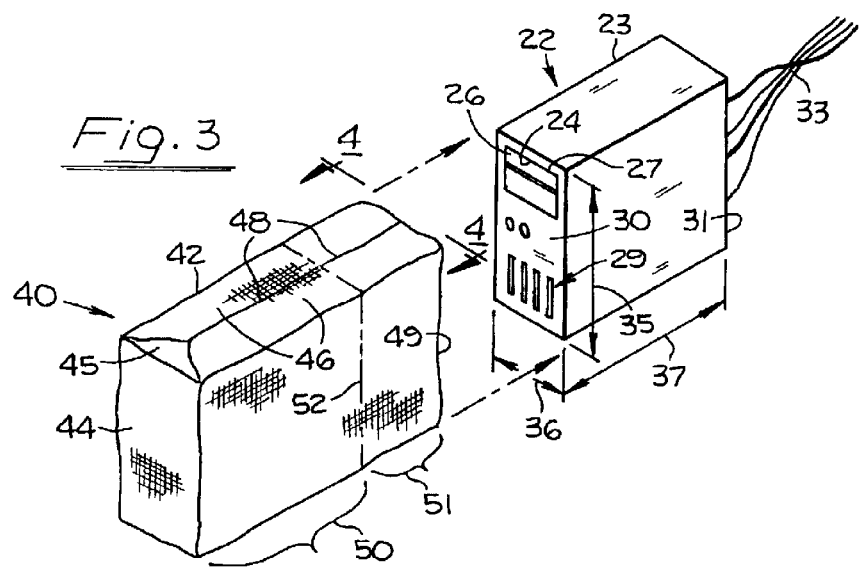
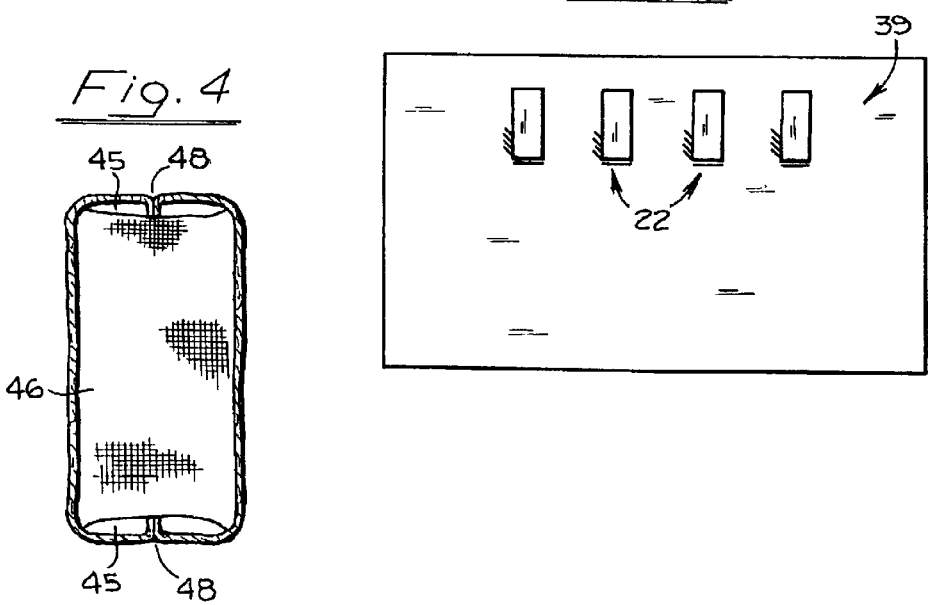

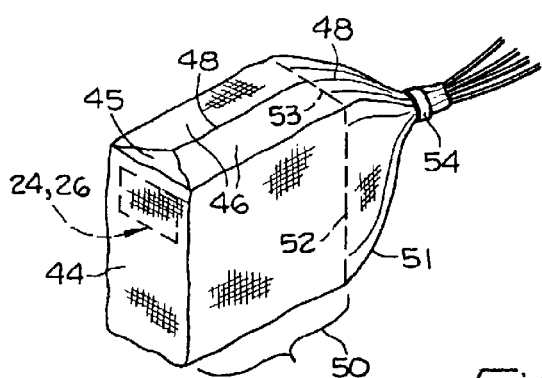
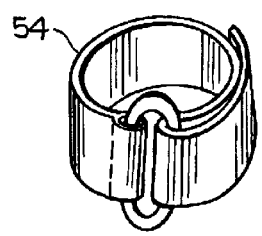
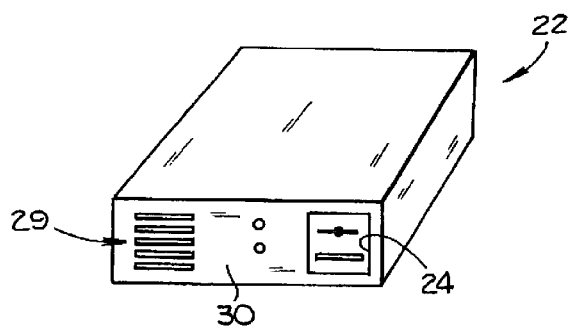
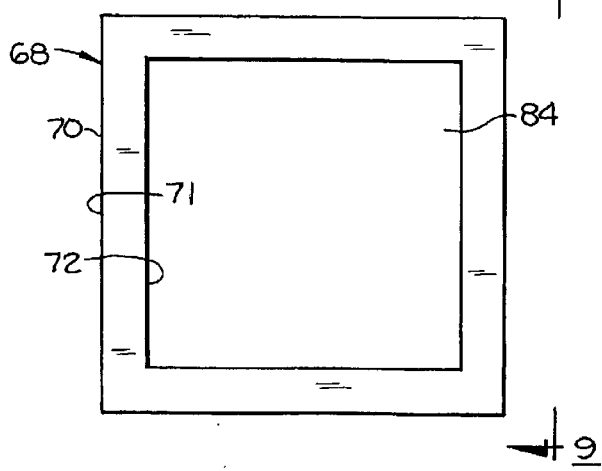
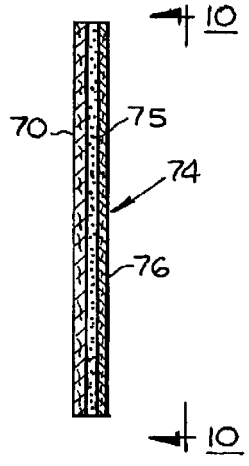

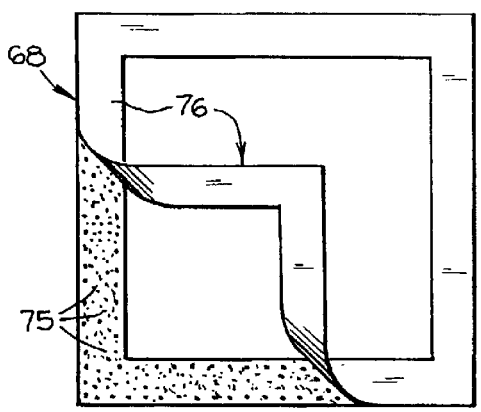
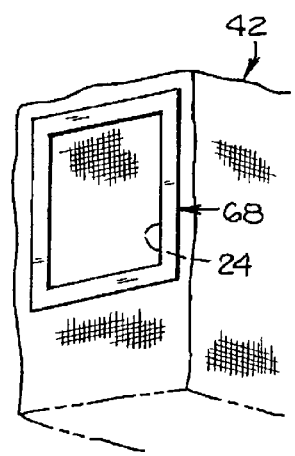
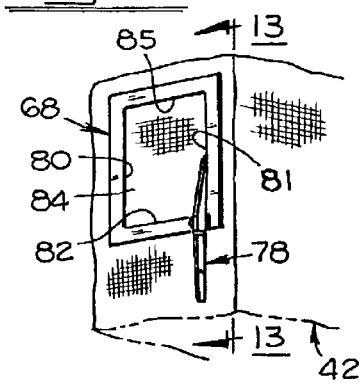
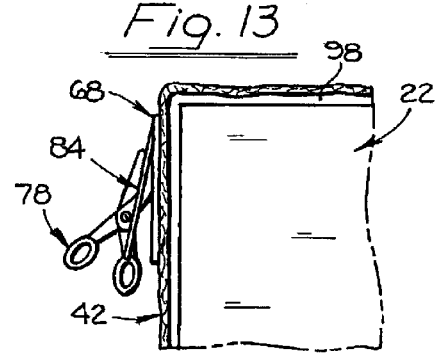
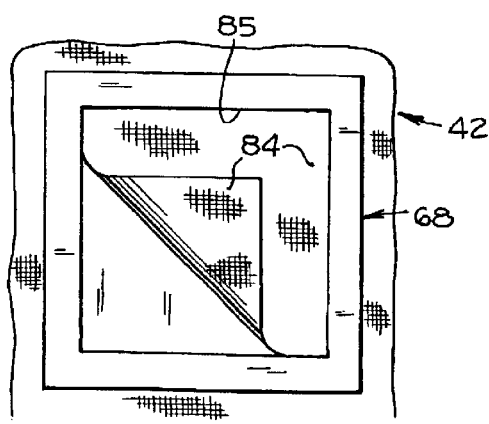

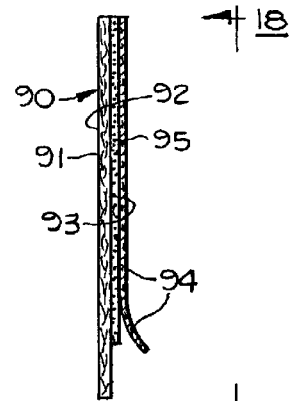
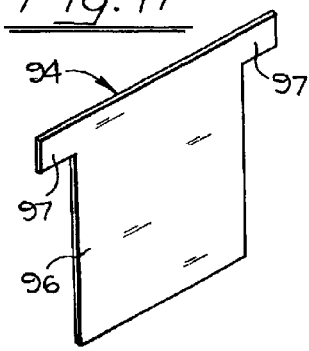
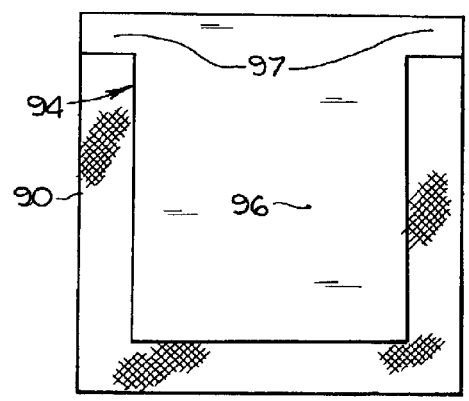
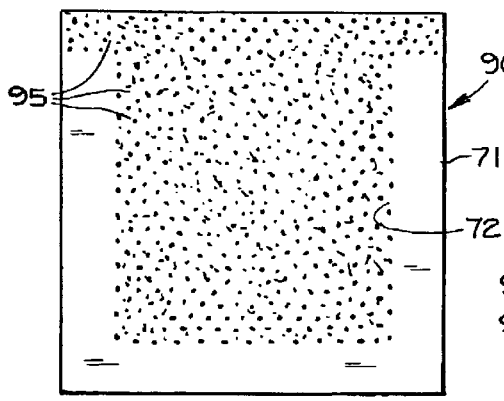
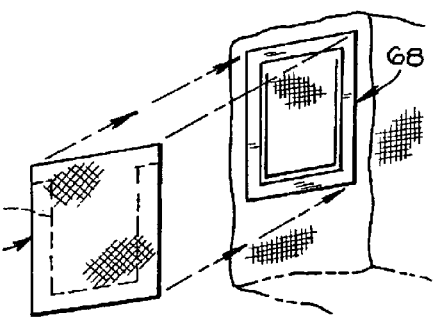

AIR FILTER FOR COMPUTERS

FIELD OF THE INVENTION

The invention relates generally to a filter for computers. It is adaptable to various kinds of computers, but attention is directed to a common form of computer, having an outer housing or casing, and various internal elements therein. This devise is commonly known as a PC or personal computer. It includes an internal fan for developing a current of air through the casing for cooling the internal elements which develop heat in their course of operation.

Computers are very often used in a shop environment where dust particles are developed, and in driving a current of air through the computers, the dust particles are drawn through the computers and deposited on the internal elements.

A main purpose of the invention is to provide a filter for filtering the air in which the computers are placed, and especially, such a filter having the following uses and advantages.

1. The filter is applied to the computer by completely enclosing it and filtering all of the air that passes through the computer.
2. The filter is a very simple article, very simple to manufacture and simple to use.
3. An individual filter is applied to each separate computer.
4. The filter dimensions can be easily modified to assume the shape and size of any of a wide variety of computers.
5. The filter includes a bag which enables an opening to be cut therethrough in register with an opening in the computer, and again closed to an almost perfect sealed position.

BRIEF DESCRIPTION OF THE INDIVIDUAL FIGURES OF THE DRAWINGS

FIG. 1 is a perspective view of a computer with which the filter of the present invention is used.

FIG. 2 is a diagrammatic plan view of a shop in which computers are used.

FIG. 3 is a perspective view of the filter of the present invention.

FIG. 4 is an end view of the filter of FIG. 3 taken in the plane of the line 4—4.

FIG. 5 is a perspective view of the filter applied to the computer.

FIG. 6 is a clamping band used for securing the filter in closed position on the computer.

FIG. 7 is a perspective view of a computer lying in a different position from that of FIG. 1.

FIG. 8 is a face view of an element identified as a door frame.

FIG. 9 is an edge view taken at line 9—9 of FIG. 8.

FIG. 10 is a view taken at line 10—10 of FIG. 9 and showing the cover strip partially peeled off.

FIG. 11 is a fragmentary perspective view of the fore end of the assembly shown in FIG. 5, with the door frame applied thereto.

FIG. 12 is a view similar to FIG. 11 representing the step of cutting the filter bag.

FIG. 13 is a view taken approximately at the line 13—13 of FIG. 12 to show details of the step of cutting the bag.

FIG. 14 is a view from the left end of FIG. 13 showing the inner flap that is cut in the step represented in FIG. 13.

FIG. 15 is a face view of a door flap.

FIG. 16 is an edge view taken at line 16—16 of FIG. 15.

FIG. 17 is a perspective view of a "T" element used temporarily as a protective element in the sub assembly that closed the opening in the bag.

FIG. 18 is a view of the rear side of FIG. 16 taken at line 18—18 of FIG. 16 and showing the "T" element.

FIG. 19 is a view similar to FIG. 18 but with the "T" element removed.

FIG. 20 is similar to FIG. 11 but also showing the cover flap being applied after all of the other elements in the sub assembly are in place.

DETAILED DESCRIPTION OF THE DRAWINGS

Reference is made in FIG. 1 which shows a computer 22 in perspective. This form of computer is of a very common and known type and the filter of the invention is adapted to use therewith although it is not limited to that kind of computer.

Th computer 22 includes an outer casing 23 which is in the form of a box having various openings therethrough. Within the casings are a plurality of computer elements (not shown), and as a standard item, the computer includes a fan inside the casing for developing and directing a stream of air on the internal elements for cooling them. The casing is typically provided with openings 24 through which an internal element such as a disc, is inserted into the casing and withdrawn therefrom. These openings are normally covered by a mechanical doors 26 which are opened when inserting an item such as a disc, and then again moved to a closed position. However, a space 27 usually occurs between the mechanical doors 26 and the openings 24 which allows air inflow into the computer 22. The computer 22 is typically designed with openings 29 that allow air to flow into the computer 22. Attention is drawn to the fact that any small opening in the computer 22 such as holes in the back of the computer will allow air and dust into the computer 22 was not effectively filtered heretofore.

The computer 22 includes a front end 30 and a rear end 31 from which electrical conductors or wires 33, lead from the internal elements to the exterior.

For convenience, the computer is considered as having a height dimension 35, a width dimension 36 and a length dimension 37.

Reference is made to FIG. 2 which is a diagrammatic plan view representing a shop 39 in which a plurality of computers 22 are located according the usual operating routine. This figure represents a condition of environment in which the filter of the present invention is particularly adaptable and useful.

It will be noted (FIG. 1) that the computer is of generally rectangular shape in cross section, as viewed in vertical transverse plane, a point of significance is the construction of the filter.

The filter of the invention is shown in perspective view at 40. It includes a bag 42 which constitutes a principal component of the filter. The filter is made of a material of known kind in the form of a sheet having filter pores, and is otherwise imperforate, except for those pores.

To form the bag, a segment of the material is cut, and folded as indicated in FIG. 3, to rectangular shape. It includes a bottom end element 44 with triangular flaps 45 at the ends folded over to form the side end elements of the desired rectangular size. Other flaps 46 at the sides are folded over and their meeting edges are sewed in a seam 48 (FIGS. 3, 4, 5) which runs from the flaps 45 to the opposite end of the bag indicated at 49 (FIGS. 3 and 5). In FIG. 3 the numeral 50 indicates a lower segment of the bag 42 which is of a length substantially the same as the length of the computer 37. Additional length 51 is formed at the open upper end of the bag. It is noted that different patterns to produce the same shape bag could be used. It is also noted that methods other than sewing could be used to create an effective seam.

After the bag 42 is constructed, it is applied over the computer, or stated in another way, the computer, is inserted into the bag. The relationship between these two items is shown in FIGS. 1 and 3, showing the two items poised for placing the bag 42 over the computer 22.

FIG. 5 shows the two items thus assembled. This figure shows the line 52 (FIG. 3) and a line 53 in register with the rear end 31 (FIG. 1) of the computer, and the additional length 51 is drawn overthe wires 33 of the computer (FIG. 5), closely confining the wires and held by a band 54 (FIG. 6) which may be of a known type. This band is a basic linear piece drawn into a circle with the ends held together by hook-and loop gripping of a type well known as Velcro (TM). This securing means is drawn up firmnly, which draws up the bag to a near perfect seal against flow of air therethrough.

While the securing means 54 is preferably of the kind described, other forms of securing may be used instead, if desired. Such alternate securing means may for example be in the form of a draw-up line embedded in a seam in the open end of the bag.

The bag 42 constitutes a first main component of the filter bag, and a second main component is made up of a plurality of pieces shown in FIGS. (8–20) which are applied to the bag in forming an opening to provide access therethrough and into the interior of the computer.

(FIG. 1) shows the computer standing on edge, which is a very common position in the use of such computers, this style computer is commonly known as a tower computer. In this position the opening 24 is typically uppermost. (FIG. 7) shows a computer lying on a flat side, with the opening 24 toward one side, laterally, this style computer being commonly known as a desk top computer.

The bag is closely similar to the computer in cross section and thus the bag is easily applicable to the computer in any position.

After the bag is so applied to the computer, an opening is formed in the bag in register with the opening 24 in the computer. A point is made of the fact that when the bag is applied to the computer, it is essentially one piece and after it is so applied to the computer, regardless of the shape of the computer, the opening is made in register with the opening 24 in the computer wherever the latter is located.

Reference is now made to FIGS. (8–20) which show the steps in cutting the hole in the bag and closing and sealing it again, using pieces applied to the bag.

FIG. 8 shows a face view of a door frame 68, which is made up of paper board or other stiff thin board like product and includes a rectangular peripheral planar frame 70 having an outer edge 71 and inner edge 72. The rear side 74 is indicated in (FIG. 10) on which adhesive material 75 and a backing element or cover strip 76 is applied over that adhesive material and provides a non-adhesive surface to facilitate handling it. It is noted that, while we believe this method of attachment to be the most effective method, other means of attaching the frame to the surface can be used.

The cover strip 76 can be peeled from the door frame (FIG. 10), exposing the adhesive material 75, and after so removing it, the door frame 68 is applied to the filter bag (FIG. 11) with the adhesive material 75 engaging the filter bag. The frame is applied in register with the opening 24 in the computer, in surrounding relation thereto. The frame is then pushed against the filter bag to fully adhesively secure it thereto.

After the frame is so applied (FIG. 11) a cutting step is performed as represented in (FIGS. 12 and 13). The user utilizes a pair of scissors 78, for example, and cuts through the material of the filter bag along the vertical side lines 80, 81 and the bottom horizontal line 82, i.e., along the inner edges of the corresponding legs of the door frame 68. This provides an inner flap 84 cut from the material of the filter bag but remaining secured thereto at the upper horizontal line 85 which is coincident with the inner line of the door frame. This inner flap 84 can be lifted at its lower edge, which then forms a hole through the filter, and exposes therethrough the opening 24 and the mechanical doors 26 in the computer.

An outer door flap 90 (FIG. 15) is provided as a separate sub unit which includes a rectangular outer continuous element 91 (FIG. 16) formed of flexible material, which may be a paper like product, having a front side 92 and a rear side 93. Secured to the rear side, is a "T" element 94 (FIGS. 16–18) by an adhesive material 95 which extends though out the area covered by the "T" element. In the use of the devise, the "T" element is manually peeled off (FIG. 16) by the user which exposes the adhesive material 95 (FIG. 19). The adhesive material remains on the door flap as a separate element (FIG. 19) and the "T" element can then be discarded.

The outer door flap 90 is then applied to the assembly (FIG. 20) with the adhesive material 95 in engagement with the inner flap 84 and pressed against it to which it remains secured.

Referring to (FIGS. 17 and 18) the "T" element includes a main body portion 96 and ears 97. The body portion 96 is slightly smaller than the size of the inner area of the door frame 68 (FIG. 8) and the ears 97 extend laterally to approximately the outer edges of the door frame 68(FIG. 8). When the "T" element is peeled off, the adhesive material 95 which remains on the outer door flap is exposed over the full area of that flap. The outer flap is then applied to the other pieces previously applied, with the adhesive material 95 engaging the assembly, and pressed there against. The outer flap is then secured to the inner flap and the surrounding door frame.

The inner flap and the outer flap thus form a flap unit securely adhered together and function as a single element for the user. Upon lifting the flap unit, the inner flap is of course raised also, and this exposes the opening 24 in the computer.

After performing the steps desired when the flap unit is open, such as replacing an inner element of the computer, the user lowers the flap unit, and in this step, the inner flap enters into the space in the bag from which it was cut, and it completely fills that space and thus effects a nearly perfect seal in the filter bag.

While it was noted above, the filter bag conforms rather closely to the computer, there is nevertheless a space between the computer and the filter bag as indicated at 98 (FIG. 13). Preferably, this space extends throughout the area between the computer and the corresponding portion of the bag, so as to enable air to move about in various directions in that space.

The filter bag provides an immense area of filtering effect, which includes the portion directly surrounding the computer, and the end portion formed by the additional length 51, that covers the wires 33. The space 98 (FIG. 13) works together with the space within the additional length to provide a great space or volume for the air to pass. The internal elements are cooled by the cooling fan in the computer and thus a great filtering effect is provided while enabling a complete and full cooling effect provided by the fan to the full extent that it would be provided if the filter were not used.

I claim:

1. A method of filtering dust laden air that is used for ventilating an article, the article having an opening therethrough, comprising, placing a bag made of appropriate air filtering means over and entirely enclosing the article therein, the bag having a main opening for inserting the article thereinto and being otherwise imperforate except for open cells for passage of air therethrough in a filtering function, entirely closing the main opening against the passage of air therethrough, placing a surrounding frame element to the bag and adheringly securing it thereto, to a position superimposed on and substantially surrounding the access opening in the article, the frame member having a cover flap thereon which includes a first edge, the method further including, the step of cutting the cover flaps and the portion of the material of the bag in register therewith along all edges except the first edge, on lines forming inner edges of the frame, but not along the first edge, adhering the cover flap to the second flap, forming a double flap hinged along the first edges and swingable between a closed position and an open position in which a hole exists therethrough, the bag thereby enabling the user to reach through the holes thereby providing access to the article.

2. A method according to claim 1, and including the steps, placing of filtering material over and entirely enclosing the article therein, the bag having a main opening for inserting the article thereinto and being otherwise imperforate except for open cells for passage of air therethrough in a filtering function, entirely closing the main opening against the passage of air therethrough, cutting a hole in the bag in register with the opening in the article, and, forming a cover and releasably securing it to the bag in position entirely covering the hole in the bag, the cover including a layer extending throughout the outline extent of the cover composed of material similar to the material of the bag.

3. A method according to claim 2, wherein, the step of forming the cover includes cutting a piece from the material making up the bag, the thereby form the panel.

4. A method according to claim 3 wherein, in the step of cutting the panel, it is so cut as to leave an edge of the panel still connected with the material of the bag and the panel is thereby hinged thereto and whereby when the cover is opened and thereafter closed, the panel is returned into the hole in position entirely surrounded by the material of the bag.

5. A method according to claim 4 and including the step, applying a protector layer over the panel in hinged relation to the bag and acting in conjunction with the panel to form a hinged doubleflap.

6. A method according to claim 2 and comprising, placing of suitable filtering material over and entirely enclosing the article therein, the bag having a main opening for inserting the article thereinto and being otherwise imperforate except for open cells for passage of air therethrough, entirely closing the main opening against the passage of air therethrough, placing a surrounding frame element to the bag and adheringly securing it thereto, at a position superimposed on and substantially surrounding the opening in the article, the frame member having a cover flap therein, which includes a first edge, the method further including, the step of cutting the cover flap and the portion of the material of the bag in register therewith along all edges except for the first edge, on lines forming inner edges of the frame, but not along the first edge, the cutting step forming a second flap of the material of the bag, adhering the cover flap to the second flap, forming a double flap hinged along the first edge and swingable between a closed position and open position in which a hole exists through the bag thereby enabling the user to reach through the holes thereby providing access to the article.

7. A filter for filtering air that comes into contact with an article of predetermined size, comprising a bag made up of a sheet of flexible filtering material that is continuous and has only small cells through which air passes in the filtering action, the bag having a closed lower end and a main opening at its upper end, the main opening being of a size enabling the insertion of the article therethrough and into the bag, the bag having flaps at its upper end surrounding the main opening and extending upwardly beyond the article when the article is in the bag, the flaps being capable of being rolled over the upper end of the bag to entirely close the main opening, the flaps being capable of having detachable securing means applied thereto for securing the flaps in rolled-over position, and the bag including, at a location displaced from its upper end, a secondary opening, enabling manual access to the article, the bag including a section of the filtering material manually movable into a closed position over the secondary opening, thereby producing filtering action continuously throughout the area of the bag, and manually removable therefrom to an open position.

8. The filter according to claim 7 and including the article therein, the article having an access opening at such a location therein that when the article is in the bag the secondary opening is in register with the access opening in the article.

9. A filter according to claim 7, wherein said section is of greater thickness than the remainder of the material making up the bag.

10. The combination according to claim 8 wherein said section is of greater perimeter than the secondary opening and overlies the marginal edge of the bag surrounding the opening.

11. The combination according to claim 7 in combination with said manually releasable means securing the flaps in roller-over position.

12. The combination according to claim 9 wherein, said section is made up of a pair of leaves fitted together in face-to-face relation.

13. The combination according to claim 8 wherein, the article includes a computer wherein, the computer includes an outer casing and computer elements in the casing, the computer elements include certain ones controlled by a disc insertable through the access opening into a functioning position in the casing and removable from that position through the access opening to the exterior of the filter, whereby, to enable manual insertion of a disc from the exterior into the computer casing and manual removal therefrom to the exterior without disturbing the filter.

* * * * *